United States Patent [19]
Kretow et al.

[11] Patent Number: 5,508,054
[45] Date of Patent: Apr. 16, 1996

[54] THIXOTROPIC DONUT ICING

[75] Inventors: John Kretow, Fairport; Bruce N. Sattelberg, Williamson, both of N.Y.

[73] Assignee: Van den Bergh Foods Co., Division of Conopco, Inc., Lisle, Ill.

[21] Appl. No.: 389,441

[22] Filed: Feb. 15, 1995

Related U.S. Application Data

[63] Continuation of Ser. No. 143,277, Oct. 26, 1993, abandoned.

[51] Int. Cl.⁶ .................................................. A23G 3/00
[52] U.S. Cl. ............................ 426/573; 426/575; 426/659
[58] Field of Search ............................. 426/44, 572, 575, 426/659, 302, 658

[56] References Cited

U.S. PATENT DOCUMENTS

| | | | |
|---|---|---|---|
| 3,767,830 | 10/1973 | Reimer | 426/659 |
| 3,849,395 | 11/1974 | Moriano | 426/575 |
| 3,874,924 | 4/1975 | Sands et al. | 426/659 |
| 3,917,874 | 11/1975 | Sands et al. | 426/659 |
| 4,135,005 | 1/1979 | Cheng | 426/659 |
| 4,389,426 | 6/1983 | Reissmann et al. | 426/602 |
| 4,943,445 | 7/1990 | Norton et al. | 426/573 |
| 4,956,193 | 9/1990 | Cain et al. | 426/573 |

FOREIGN PATENT DOCUMENTS

| | | |
|---|---|---|
| 0052899 | 6/1982 | European Pat. Off. . |
| 0271132 | 6/1988 | European Pat. Off. . |
| 0298561 | 1/1989 | European Pat. Off. . |
| 0432835 | 6/1991 | European Pat. Off. . |

OTHER PUBLICATIONS

Product Brochure, Carrageenan Gum, FMC Corporation.

*Primary Examiner*—Jeanette Hunter
*Attorney, Agent, or Firm*—Rimma Mitelman

[57] ABSTRACT

A thixotropic white donut icing which contains sweetener solids, iota carrageenan gum and calcium ion, wherein the carrageenan gum and calcium ion are effective to render the icing thixotropic.

23 Claims, No Drawings

THIXOTROPIC DONUT ICING

This is a continuation of Ser. No. 08/143,277, filed Oct. 26, 1993, now abandoned.

FIELD OF THE INVENTION

The invention relates to icing compositions for donuts and methods of preparing the compositions.

BACKGROUND OF THE INVENTION

Iced donuts are prepared by dipping a donut into an icing. Unfortunately, icing compositions for donuts are solid at room temperature due to the presence of a large amount of shortening in the icing. Hence, prior to the present invention, the icing had to be heated so that the donut could be dipped into the icing. A serious drawback of such process is the need for heating the icing prior to dipping and having to cool an iced donut subsequently to dipping. A donut icing is desirable which is sufficiently liquid at room temperature to allow donuts to be dipped into the icing (thus eliminating the time and energy required for heating the icing) and, yet, is sufficiently viscous not to run off the donut.

Accordingly, it is an object of the present invention to provide thixotropic chocolate and white icing compositions for donuts, which icing compositions liquefy when shaken or stirred (which occurs when a donut is dipped into the icing) and solidify when left standing (which occurs when icing is coated on the donut).

It is another object of the invention to provide chocolate and white icing compositions which are essentially free of fat yet have the taste, texture, and shine substantially similar to the taste, texture, and shine of traditional solid, fat-based icing compositions.

It is yet another object of the invention to provide methods of preparing thixotropic fat-free compositions containing a large amount (i.e., more than 70% or even more than 80%) of sweetener solids.

These and other objects of the invention will become more apparent from the detailed description and examples which follow.

SUMMARY OF THE INVENTION

The above objects are attained by the present invention which is based, in part, on the discovery that the inclusion of a specific carrageenan gum and a specific metal ion into a composition containing a very large amount of sugar imparts a thixotropic property to the composition, if the gum and the metal ion are included in effective amounts and if a particular process (described below) is employed to prepare the composition.

Although various gums have been previously used for thickening aqueous-based compositions, the use of gums for thickening a composition containing a super high amount of sugar presents a challenge and has not heretofore been recommended. Specifically, sugar and other sweeteners have a very high affinity for water; in systems containing extremely high amounts of sugar (e.g., icings), a very low amount of water is left for a gum to react with and, thus, the use of gums to thicken icing compositions is usually ineffective.

In the present invention, however, an icing containing at least 75% sweetener solids is attained by virtue of the inclusion of carrageenan gum and a specific metal ion in specific amounts and by virtue of inventive processing which includes a particular order of addition of various ingredients at specific temperatures defined below.

The inventive icings may be white or chocolate. The term "white" as used herein means non-chocolate icing. The white icing of the invention is not necessarily white in color. For instance, the invention includes a strawberry icing, which is a white icing containing a strawberry flavor and a red food die; the resulting strawberry icing is actually pink rather than white. Nevertheless, all non-chocolate icings, whatever their flavor and color, are collectively termed "white" for the purposes of the present description.

The inventive chocolate icing and the inventive white icing include many of the same ingredients (i.e., granular sugar, fondant, water, iota carrageenan gum, and a specific metal ion), although the amount of some of the ingredients (e.g., fondant) differs somewhat depending on whether the icing is white or chocolate. The chocolate icing according to the present invention must further include cocoa and, preferably, includes maltodextrin. Due to the presence of non-soluble additional ingredients in the chocolate icing, the total soluble solids content of the chocolate icing is lower than that of the white icing. The total soluble solids content of the white icing ranges from about 82% to about 85%, while the total solids content of the chocolate icing ranges from about 75% to about 79%. The white icing according to the present invention preferably includes agar gum. Soluble solids content is measured by preparing a 50/50 water/icing solution, observing a refractometer reading and multiplying the observed reading by a factor of 2.

The compositions of the inventive icings are radically different from the composition of a traditional icing yet the inventive icings are substantially similar to the traditional fat-based icing in taste, texture, and shine.

The invention also includes methods of preparing the inventive white and chocolate icing compositions. The methods according to the invention generally involve preparing preblends of various ingredients in water at specific increased temperatures for each preblend, and then mixing the preblends at defined high temperatures and in a specific order to attain the inventive thixotropic icings. Due to the presence of cocoa and optional (but preferred) presence of maltodextrin in the inventive chocolate icing, the method of preparing the chocolate icing differs from the method of preparing the inventive white icing. Specifically, the chocolate icing preparation according to the present invention involves making a concentrated (almost saturated) solution of sugar and adding cocoa to the resulting solution; a separate solution containing an iota carrageenan gum is prepared and added to cocoa solution; fondant and a separately prepared maltodextrin solution are finally added to the resulting mixture. Thus, the preparation of the chocolate icing involves the preparation of at least two and, preferably, three preblends: a cocoa preblend, a gum preblend, and, desirably, a maltodextrin preblend. The preparation of the white icing involves preparing a carrageenan gum solution with some sugar, adding the remaining sugar and, finally, adding fondant.

The temperatures at each stage of both inventive processes and the order of addition are critical and will be further defined and discussed below.

An iced donut may be prepared utilizing the inventive white or chocolate icing by dipping the donut into the icing without preheating the icing. The use of the inventive icing obviates the need for heating the icing, thus effectively decreasing the time and energy required in the production of iced donuts.

DETAILED DESCRIPTION OF THE INVENTION

Unless otherwise specified or required by the context, percentages of ingredients are by weight of a final icing composition.

The term "granular sugar" as used herein means sugar in the form of granules and does not include any finely crystallized sugar or finely crystallized sugar in a fondant.

The term "fondant" as used herein means a paste containing finely crystallized sugar, corn syrup, and water. Fondant suitable for inclusion in the inventive compositions contains from 67% to 78% of finely crystallized sugar, 11% to 22% of corn syrup, and from 9% to 13% of water. Whenever water is mentioned in the present description, water contained in the fondant is not included in that amount. Whenever granular sugar is mentioned in the present description, finely crystallized sugar in the fondant is not included in that amount.

The icing compositions according to the present invention include as necessary ingredients sweetener solids, water, an iota carrageenan gum, and a specific metal ion. White icing compositions according to the invention preferably further include agar gum. Chocolate icing compositions according to the invention must include cocoa and preferably include maltodextrin. In general, the proportions of soluble ingredients and water in the inventive compositions are such as to attain the total soluble solids content in the chocolate icing of from about 75% to about 79% (preferably, from 77% to 79%) and the soluble solids content in the white icing of from about 82% to about 85% (preferably, from 83% to 85%).

The first essential ingredient of the inventive compositions is comprised of sweetener solids. Sweetener solids (granular sugar, as well as finely crystallized sugar and optionally, corn syrup solids) are the main soluble solid ingredients in the icing compositions, predominantly contributing to the solids content recited above. The inventive icing compositions contain at least 75% of total sweetener solids. The total sweetener solids content of the inventive white icing compositions is even higher, i.e., more than 80%.

Sweetener solids may include granular sugar or finely crystallized sugar or corn syrup, or mixtures thereof.

The inventive icing compositions preferably include from about 7% to about 12% of granular sugar. Sugar (granular sugar, as well as finely crystallized sugar in the fondant) is included in the inventive compositions to attain sweetness and necessary bulk. White icing according to the present invention preferably contains from about 5% to about 10% granular sugar, preferably from 7% to 9% in order to achieve the necessary sweetness and bulk yet to avoid excessive thickening of the icing. The chocolate icing according to the present invention preferably contains from about 8% to about 13% of granular sugar, preferably from 9% to 12%.

The second preferred ingredient from which sweetener solids are derived in the inventive compositions is fondant, i.e., a paste of finely crystallized sugar, corn syrup and water. Fondant contributes to the sweetness and bulk in the compositions, and, in addition, tiny sugar crystals in the fondant impart shine to the final icing compositions. Fondant employed in the present invention includes finely crystallized sugar in an amount ranging from 72% to 78%, by weight of the fondant, preferably in an amount ranging from 75% to 78%. If too much sugar is used, the fondant becomes hard; if too little is used, the fondant does not crystallize out, or the sugar crystals grow too slowly which results in a gritty texture.

The fondant employed herein further preferably includes corn syrup which helps to control the size of the tiny sugar crystals. The content of corn syrup in the fondant is preferably from 10% to 20%, most preferably from 10% to 15% by weight of the fondant. If too much corn syrup is employed, the thixotropic property of the icing is impaired since the increased amount of corn syrup results in increase in the flow.

The inventive icing compositions preferably include from 68% to 83% of fondant. White icing compositions preferably include from 80% to 86% of fondant, most preferably from 82% to 84% in order to provide correct viscosity and quick drying on a donut. Chocolate icing compositions preferably include from 65% to 70%, most preferably from 67% to 69%.

The second essential ingredient of the inventive icing compositions is an iota carrageenan gum. According to the present invention, the iota carrageenan gum in combination with a specific metal ion are included in effective amounts to render the icing thixotropic. Other gums were tried in the course of developing the inventive compositions, i.e., zanthan gum, locust bean gum, agar, algin, carboxymethyl cellulose. It was discovered as part of the present invention that specifically iota carrageenan gum, rather than any gum, must be employed in combination with a specific metal ion in specific amounts in order to attain icing composition which is thixotropic, yet also shiny and smooth. For example, the inclusion of the guar gum instead of the iota carrageenan gum was found to cause wrinkling in the icing upon drying and also resulted in "wet underside" (i.e., water molecules could not migrate through outer icing layer thereby causing the icing to solubilize and form a syrup layer at the donut interface).

The iota carrageenan gum is present in the inventive compositions in an amount ranging from about 0.04% to about 0.2%. Preferably, the amount of carrageenan gum in the inventive white icing is from 0.04% to 0.10% and in the inventive chocolate icing from 0.08% to 0.15%, in order to achieve proper viscosity. The most preferred amount of the iota carrageenan gum in the inventive white icing is from 0.04% to 0.06%, and in the inventive chocolate icing from 0.08% to 0.12%.

The third essential ingredient of the inventive icing compositions is a specific metal ion. The metal ion employed in the present invention is selected from the group consisting of alkali and alkaline earth metal ions, preferably the metal ion is calcium, or sodium, or potassium. Mixtures of metal ions may also be employed. The metal ion is employed in an amount which, in combination with the iota carrageenan gum, would render the icing thixotropic. Preferably, the inventive compositions include calcium ion because calcium ion is most effective, so less is needed to attain thixotropy in the inventive icings. When calcium is the metal ion of choice, the inventive compositions include from 0.004% to 0.01% of calcium ions. Preferably, calcium is present in the inventive white icing in an amount of from 0.004% to 0.008% and in the inventive chocolate icing in an amount of from 0.008% to 0.015%. The concentration of calcium in the inventive compositions is critical: too little or too much calcium results in an icing which is too thin and nonthixotropic. Calcium may be included in the inventive compositions in the form of any water-soluble calcium salt, e.g., calcium chloride. Calcium chloride is particularly preferred since it is very soluble in water, and readily available. When calcium chloride is employed, the inventive compositions include from about 0.005% to about 0.03% of calcium chloride. Preferably, the inventive white icing includes from 0.004% to 0.012% of calcium chloride, and the inventive chocolate icing includes from 0.01% to 0.02% of calcium chloride.

The fourth essential ingredient of the inventive compositions is water. Water must be included in a sufficient amount to attain fluid but not excessively liquid compositions. Further, the excessive amount of water in an icing dulls the shine. The amount of water is such as to attain the solids content recited above for chocolate and white icing compositions according to the invention. White icing compositions according to the invention typically include from about 5% to about 9%, preferably from 6% to 8% of water. Chocolate icing compositions according to the invention typically include from about 10% to about 14%, preferably from 11% to 13%, of water. As noted above, the water in the fondant is not included in these amounts.

Chocolate icing compositions further include cocoa as another essential ingredient. Cocoa is included in the inventive chocolate icing in an amount ranging from about 4.5% to about 6.5%. Preferably, the amount of cocoa in the chocolate icing according to the invention is from 5% to 6.1%, most preferably from 5.6% to 6.1%, in order to achieve desired color and flavor.

A preferred optional ingredient of the inventive chocolate icing is maltodextrin. The presence of maltodextrin in the chocolate icing according to the invention results in optimum shine. Whether a particular maltodextrin is suitable for inclusion in the inventive chocolate icing compositions depends on the solubility of maltodextrin and its ability to contribute to shine, which properties are functions of the molecular weight and the dextrose equivalent of the maltodextrin. Suitable maltodextrin has a solubility in water of at least 100% (in boiling water) and the dextrose equivalent in the range of from 13 to 17%. The inventive chocolate icing compositions include from about 1% to about 3% of maltodextrin, preferably from about 1.5% to about 2%. Although the white icing according to the invention may include maltodextrin, the presence of maltodextrin is more beneficial in the inventive chocolate icing.

The preferred optional ingredient for the inventive white icing is agar gum. It was found, as part of the present invention, that in the white icing the presence of agar gum in addition to the iota carrageenan gum and the metal ion, results in optimum thixotropy. Agar gum is preferably included in the inventive white icing in an amount ranging from about 0.01% to about 0.05%.

The inventive compositions may include other optional ingredients, such as colorants (e.g., titanium dioxide, caramel) typically included at a level of from 0.005% to 1%; salt, typically included at a level of from 0% to 0.2%; preservatives, typically included at a level of from 0.05% to 0.1%; flavor (e.g., vanilla, maple, strawberry, honey, caramel, and butter), typically included at a level of from 0.01% to 0.2%.

The invention includes methods of preparing the inventive icing compositions. The inventive methods of preparing the icing compositions differ slightly, depending on whether the chocolate icing or the white icing is prepared.

According to the present invention, the inventive white icing is prepared by carrying out a series of steps, as follows:

a) Heating a mixture comprising from about 25% to about 35% (preferably from 29% to 31%) of granular sugar, by weight of total granular sugar, water, the iota carrageenan gum and the metal ion to a temperature in the range of from about 96° to 101° C. (preferably in a range of from 100° C. to 101° C.), to obtain a first solution. Preferably, the source of metal ion, e.g., calcium chloride, is dissolved in water first, then a dry preblend of granular sugar and iota carrageenan gum is prepared and added to the metal ion solution. In a preferred embodiment of the present invention the dry preblend includes agar gum.

b) Dissolving the remaining granular sugar in the first solution prepared in step (a), to obtain a second solution. All sugar should be dissolved before proceeding to the next step.

c) Adding with stirring fondant to the second solution at a temperature in the range of from 49° C. to 54° C. (preferably in the range of from 49° C. to 52° C. to obtain the icing. The stirring is conducted in this step for an amount of time sufficient to attain a smooth icing. Preferably the stirring is conducted for at least 8 minutes, most preferably for 8 to 12 minutes.

According to the present invention, the inventive chocolate icing is prepared by carrying out a series of steps, as follows:

a) Heating a mixture of from about 8% to about 15% (preferably from 10% to 12%) of granular sugar, by weight of total granular sugar, the iota carrageenan gum, and from about 20% to about 50% of water (preferably from 38% to 42%), by weight of total water, to a temperature in the range of from about 96° C. to about 101° C. (preferably from 100° C. to 101° C., to obtain a first solution. Preferably, in this step the gum is premixed with sugar and the premix is stirred with high agitation into water and heated. According to the present invention, the content of this mixture is preferably in the range of from 23% to 26%, most preferably in the range of from 24% to 25%; the solids content may be adjusted with additional water. According to the preferred embodiment of the invention, this first solution obtained in this step is not allowed to cool below 43° C., most preferably not below 38° C.

b) Heating a mixture comprising from about 40% to about 50% (preferably from 44% to 46%) of water, by weight of total water, the remaining granular sugar, and the metal ion to a temperature in the range of from about 95° C. to about 101° C. (preferably from 99° C. to 101° C.), to obtain a second solution which solution is cooled to a temperature in the range of from 70° C. to 80° C., preferably 72° C. to 76° C.

c) Adding with stirring cocoa to the second solution, to obtain a third solution. Preferably, the third solution is mixed until it is smooth, typically for about 15 minutes.

d) Admixing the first solution obtained in step (a) to the third solution obtained in step (c) at a temperature in the range of from 38° C. to 46° C. (preferably in the range of from 38° C. to 40° C.), to obtain a fourth solution.

e) Adding with stirring fondant to the fourth solution, to obtain the icing. Preferably, the stirring is conducted until the icing is smooth, typically for up to 10 minutes. In the preferred embodiment of the invention, there is an additional step of adding a maltodextrin solution after the addition of fondant. The solution of maltodextrin includes from about 40% to about 50%, preferably from 48% to 50% of maltodextrin, by weight of the solution. The amount of maltodextrin in the icing is from 1% to 3%, and the water in the maltodextrin solution contributes from about 10% to about 20%, preferably from 13% to 17% by weight of total water in the icing.

In the process of the invention for the preparation of the chocolate icing, cocoa is added to a concentrated (almost saturated) solution of sugar, in order to disperse cocoa yet prevent it from adsorbing water—it has been found as part of the present invention that the addition of cocoa before saturation with sugar causes lumping of cocoa.

According to the preferred embodiment of the present invention, fondant employed in both inventive methods is at least 4 hours old, preferably 4 to 6 hours old, at the moment of addition to the rest of the ingredients. In both inventive processes fondant is added at a temperature which is sufficiently low to prevent the finely crystallized sugar in fondant from dissolving, since once dissolved, sugar recrystallizes in a random fashion which, in turn, results in the loss of shine in the icing. On the other hand, if the temperature at which fondant is added is too low, fondant can't be mixed in properly. Thus, the temperature range for the addition of fondant is critical in attaining an icing which retains the shine upon drying. While the finely crystallized sugar in the fondant must not be dissolved, granular sugar included in the inventive compositions must be dissolved to prevent the product from being gritty.

The compositions of the present invention are essentially free of fat.

Both inventive processes may be carried out in a conventional equipment. Preferably equipment employed is a stainless steel kettle equipped with double motion variable speed agitation and a kettle jacket equipped for steam (heating) and cold water (cooling). Agitation speeds vary from 15 to 60 rpm.

At the end of the process, the icing is packed at an increased temperature, typically in the range of from 32° C. to 37° C.

An iced donut may be prepared simply by dipping a donut into an inventive icing composition. The icing is first lightly stirred, and then a donut which has been cooled to room temperature is dipped into the icing. As the donut is removed, excess icing is allowed to drip off for about 5 seconds. The donut forms a thin dry skin within about 3 minutes and is dry to the touch within 15 to 20 minutes. The dried icing has a pleasant taste and durable shine.

The following specific examples further illustrate the invention, but the invention is not limited thereto.

EXAMPLE 1

The following white icing compositions were prepared:

| Composition | % BY WEIGHT | | | | | |
|---|---|---|---|---|---|---|
| | L | M | N | La | Ma | Na |
| Water | 8.495 | 8.169 | 8.317 | 8.259 | 7.872 | 8.036 |
| Calcium Chloride, 1% | .770 | .772 | .947 | .770 | .772 | .949 |
| Iota Carageenan | .047 | .048 | .059 | .047 | .048 | 0.059 |
| Agar | .050 | .051 | .050 | .050 | .051 | .050 |
| Sucrose | 14.800 | 14.853 | 14.799 | 11.840 | 11.882 | 11.861 |
| Fondant | 75.838 | 76.107 | 75.828 | 79.034 | 79.375 | 79.045 |
| Total Weight Grams | 1689.15 | 1683.15 | 1689.35 | 1689.15 | 1683.15 | 1686.15 |
| Observed % Soluble Solids | 82.7 | 82.0 | 82.5 | 82.0 | 82.1 | 82.0 |

Samples L, M, and N were variations on water content to achieve proper viscosity. Further improvement was observed with Sub A series, which was prepared in order to maximize gum functionality. When calcium was added in first stage, and there was no secondary heating of hydrated gums, the result was a shorter textured, more thixotropic product as observed in samples La, Ma, and Na.

EXAMPLE 2

The following chocolate compositions were prepared:

| Composition | % BY WEIGHT | | | | |
|---|---|---|---|---|---|
| | A | B | C | D | E |
| Water | 7.969 | 73814 | 6.963 | 7.565 | 8.159 |
| Calcium Chloride, 1% solution | .863 | .846 | 1.692 | 1.681 | 1.670 |
| Sucrose | 10.825 | 10.613 | 10.608 | 10.539 | 10.472 |
| Iota Carageenan | .053 | .052 | .104 | .103 | .103 |
| Cocoa | 6.641 | 6.511 | 6.508 | 6.466 | 6.424 |
| Fondant | 73.649 | 72.210 | 72.172 | 71.706 | 71.245 |
| 50% Maltodextrin Solution | 0 | 1.953 | 1.952 | 1.940 | 1.927 |
| Total Weight Grams | 1505.8 | 1535.8 | 1536.6 | 1546.6 | 1556.6 |

Observations

Sample A was shiny but too thick.

Sample B—Addition of maltodextrin resulted in improved shine but the sample was still too thick.

Sample C—Increasing gum amount did not change the thickness but some cocoa lump formation was observed.

Sample D—The same formulation as C but contained extra water. Good shine, good texture, too thick, some cocoa lump formation was observed.

Sample E—The same formulation as D but contained extra water—same results as in Sample D.

Samples A and B (containing about 0.05% iota carageenan gum) were the best samples in Example 2 in that the samples were shiny and the formation of cocoa lumps was entirely avoided.

EXAMPLE 3

The following chocolate icing compositions were prepared:

|  |  | % BY WEIGHT | |
|---|---|---|---|
|  | COMPOSITION | D | E |
| STAGE 1 | Water | 4.617 | 3.430 |
|  | Sugar | 1.262 | 1.279 |
|  | Iota Carrageenan | .099 | .050 |
| STAGE 2 | Water | 6.095 | 6.174 |
|  | Calcium Chloride | .016 | .008 |
|  | Sugar | 9.788 | 9.916 |
|  | Cocoa | 6.156 | 6.237 |
|  | Fondant | 68.273 | 69.164 |
|  | Maltodextrin (50/50 solution) | 3.694 | 3.742 |
|  | TOTAL WEIGHT | 1624.36 | 1603.43 |
|  | % SOLIDS | 77.2 | 78.2 |

Procedure

1. Sugar and viscarin were added to water. The resulting solution was brought to boil and set aside. The solution was cooled to 100° F.–110° F. and that temperature was maintained.
2. Maltodextrin solution was prepared and set aside. The solution was cooled to room temperature.
3. Stage 2 sugar and calcium chloride were added to water. The resulting solution was boiled to dissolve sugar. The solution was cooled to 165° F.
4. Cocoa was added to solution obtained step #3 and mixed until smooth.
5. Gum solution obtained in step #1 was added to the solution obtained in step #4.
6. Fondant was added and mixed until dispersed.
7. Maltodextrin solution obtained in step #2 was added to the solution obtained in step #7.
8. The solution obtained in step #7 was mixed for 3 minutes. Finished icing was packed at 95° F.–100° F.

Observations

Samples D and E were prepared in an attempt to increase viscosity.

When the level of iota carageenan gum was increased from 0.05% (Example 2) to 0.1% (Sample D, Example 3), the resulting icing had a somewhat grainy appearance. When the level of iota carageenan gum was maintained at 0.050%, but the total solids % increased (Sample E), the resulting icing had an improved appearance: the icing was not grainy, it was thicker and it had better shine.

EXAMPLE 4

The following white icing within the scope of the invention was prepared:

| STEP | PROCEDURE | INGREDIENTS | AMT. | % BY WEIGHT |
|---|---|---|---|---|
| 1 | Prepare Titanium preblend, pass through a mill at high speed to achieve full dispersion of titanium. | Water | 17.50 | 1.04 |
|  |  | Color, Titanium Dioxide | 7.50 | 0.45 |
| 2 | Add to kettle. | Water | 113.00 | 6.73 |
|  |  | Calcium Chloride | 0.13 | 0.0077 |
| 3 | Preblend Viscarin, Agar, and Sugar. Add to kettle. | Sucrose Gum, Agar | 42.00 | 2.50 |
|  |  | Gum, Iota Carrageenan | 0.55 | 0.033 |
|  |  | (Viscarin SD 389*) | 0.80 | 0.048 |
| 4 | Heat to boiling (100° C.). Add ingredients | Salt | 1.00 | 0.060 |
|  |  | Potassium Sorbate | 1.60 | 0.095 |
| 5 | Add in order. Make sure all sugar is dissolved before proceeding. Turn on cooling. Cool to 54° C.. Turn off cooling. | Sucrose, Bottlers, | 100.00 | 5.96 |
|  |  | Citric Acid Dry | 0.85 | 0.051 |
| 6 | Add Titanium preblend from above flavor. Start adding fondant @ 52° C.. | Vanilla flavor, | 1.50 | 0.089 |
|  |  | fondant | 1392.00 | 82.93 |
|  |  |  | 1678.43 (total) |  |
| 7 | Mix 8 minutes or until smooth. |  |  |  |
| 8 | Target pack temperature 35°–38° C.. Use screen at packer. Fill and invert. SOLIDS TARGET 83.0 TO 83.5 (use (50/50 solution to check solids). |  |  |  |

*Iota carrageenan from FMC Corp.

EXAMPLE 5

The following chocolate icing within the scope of the invention was prepared:

| STEP | PROCEDURE | INGREDIENTS | AMT. | % BY WEIGHT |
|---|---|---|---|---|
| 1 | Prepare ahead of time. Premix gums with sugar. Add water to kettle. Add gum/sugar blend with high agitation and heat to 101° C.. Turn off heat. Fill jacket with cooling water. Cool to 38° C.–43° C.. DO NOT REHEAT. Check solids - range is 24 to 25. Add water to correct solids | Sucrose | 20.50 | 1.26 |
|  |  | Gum, Iota carrageenan | 1.60 | 0.098 |
|  |  | (Viscarin ® SD 389) |  | 4.91 |
|  |  | Water | 80.00 |  |
| 2 | Add water to kettle). Add other ingredients, boil to dissolve 100° C.. | Water | 90.00 | 5.52 |
|  |  | Vanilla Flavor | 0.15 | 0.0092 |
|  |  | Calcium Chloride | 0.26 | 0.016 |

| STEP | PROCEDURE | INGREDIENTS | AMT. | % BY WEIGHT |
|---|---|---|---|---|
| 3 | Add cocoa @ 74° c.. Mix until smooth (about 15 minutes). When temperature is 43° C., add gum solution from above to kettle. Make sure gum solution is 38° C.–43° C. before adding. | Sucrose<br>Cocoa, Natural | 160.00<br>100.00 | 9.81<br>6.13 |
| 4 | Mix one minute, then add 4 hour old fondant. | Fondant | 1104.0 | 67.71 |
| 5 | Add caramel color. Make sure solution is 100° or less. Add maltrin solution. DO NOT RINSE WITH WATER. | Maltodextrin Solution<br>Caramel color | 60.00<br><br>14.00<br>1630.57 (total) | 3.68<br><br>0.86 |
| 6 | Cool to 32° C.–38° C.. Mix 8 minutes. Pack between 32° C.–38° C.. Fill, lid & Invert. | | | |
| 7 | Target solids - 78.0–79.00 (50/50 solution). | | | |

EXAMPLE 6

White Icing

The following white icing of maple flavor within the scope of the invention was prepared.

| STEP | PROCEDURE | INGREDIENTS | AMT. | % BY WEIGHT |
|---|---|---|---|---|
| 1 | Prepare Titanium preblend, pass through a mill at high speed to achieve full dispersion of titanium. | Water<br>Color, Titanium Dioxide | 17.50<br>2.50 | 1.04<br>0.15 |
| 2 | Add to kettle. | Water<br>Calcium Chloride | 109.00<br>0.13 | 6.49<br>0.0077 |
| 3 | Preblend Viscarin, Agar, and Sugar. Add to kettle. | Sucrose<br>Gum, Agar<br>Gum, Iota Carrageenan | 40.00<br>0.55<br>0.80 | 2.38<br>0.033<br>0.048 |
| 4 | Heat to boiling 100° C.. Add ingredients | Salt<br>Potassium Sorbate | 1.00<br>1.60 | 0.060<br>0.095 |
| 5 | Add in order. Make sure all sugar is dissolved before proceeding. Turn on cooling. Cool to 54° C.. Turn off cooling. | Sucrose<br>Citric Acid Dry | 100.00<br>0.85 | 5.96<br>0.051 |
| 6 | Add Titanium preblend from above and flavor. Start adding fondant @ 52° C.. | Fondant | 1392.00 | 82.93 |
| 7 | Add flavors & color. Mix 8 minutes or until smooth. | Vanilla Flavor<br>Maple Flavor<br>Color, Caramel | 1.50<br>9.00<br>2.10<br>1678.53 (total) | 0.089<br>0.54 |
| 8 | Target pack temperature 35°–38° C.. Use screen at packer. Fill and invert. SOLIDS TARGET 83.0 TO 83.5 (use 50/50 solution to check solids). | | | |

The ingredients included in the Examples may be obtained from the following suppliers:

| INGREDIENT | TRADENAME | SUPPLIER |
|---|---|---|
| Salt | | Morton |
| Titanium Dioxide | | Farbest Talman |
| Calcium Chloride | | Pfizer |
| Potassium Sorbate | | Eastman Chemical |
| Citric Acid | | Roche |
| Granular Sugar | | Amstar |
| Bottler Grade Sugar | | Amstar |
| Agar | | TIC |
| Iota carageenan | Viscarin SD 389 ® | FMC Marine Colloids |
| Maltodextrin | Maltrin M-150 ® | Grain Processing Corp. |

It should be understood that the specific forms of the invention herein illustrated and described are intended to be representative only. Changes, including but not limited to those suggested in this specification, may be made in the illustrated embodiments without departing from the clear teachings of the disclosure. Accordingly, reference should be made to the following appended claims in determining the full scope of the invention.

What is claimed is:

1. A thixotropic white donut icing composition comprising at least 70% sweetener solids, from about 5% to about 9% water, from about 0.004% to about 0.01% of an iota carrageenan gum, and from about 0.004% to about 0.01% of calcium ion wherein the carrageenan gum and the metal ion are present in amounts effective to render the icing thixotropic.

2. The composition of claim 1 wherein the source of calcium is calcium chloride.

3. The composition of claim 1 wherein the composition further comprises agar gum.

4. The composition of claim 3 wherein agar gum is present in an amount ranging from about 0.01% to about 0.05%.

5. The composition of claim 1 wherein the amounts of the sweetener solids and water are such that the solids content of the icing is from about 82% to about 85%.

6. The composition of claim 1 wherein the icing is essentially free of fat.

7. The composition of claim 1 wherein the sweetener solids comprise granular sugar and finely crystallized sugar.

8. The composition of claim 7 wherein the amount of granular sugar is in the range of from about 7% to about 12%.

9. The composition of claim 8 wherein finely crystallized sugar is derived from fondant and the amount of fondant is in the range of from about 81% to about 86%.

10. The composition of claim 1 wherein carrageenan gum is present in the amount which ranges from about 0.04% to about 0.1%.

11. A method of preparing a thixotropic white icing composition of claim 1, the method comprising the steps of:

a) heating a mixture comprising from about 25% to about 35% of granular sugar, by weight of total granular sugar, from about 5% to about 9% of water, from about 0.004% to about 0.01% of carrageenan gum and from about 0.004% to about 0.01% of calcium ion to a temperature in the range of from about 96° to 101° C., to obtain a first solution;

b) dissolving the remaining granular sugar in the first solution, to obtain a second solution; and c) adding with stirring from about 81% to about 86% of fondant to the second solution at a temperature in the range of from 49° to 54° C. to obtain the icing wherein the total amount of granular sugar in the composition is from about 5% to about 10%.

12. The method of claim 11 wherein the fondant is at least four hours old at the moment of addition in step (c).

13. A thixotropic chocolate donut icing composition comprising at least 70% sweetener solids, from about 4.5% to about 6.5% of cocoa, from about 10% to about 14% water, from about 0.04% to about 0.2% of an iota carrageenan gum and from about 0.004% to about 0.01% calcium ion wherein carrageenan gum and the metal ion are present in amounts effective to render the icing thixotropic.

14. The composition of claim 13 wherein the source of calcium is calcium chloride.

15. The composition of claim 13 wherein the amounts of sweetener solids and water are such that the solids content of the icing is from about 75% to about 79%.

16. The composition of claim 13 wherein the icing is essentially free of fat.

17. The composition of claim 13 wherein the sweetener solids comprise granular sugar and the amount of granular sugar is in the range of from about 7% to about 12%.

18. The composition of claim 17 wherein the sweetener solids further comprise fondant and the amount of fondant is in the range of from about 65% to about 70%.

19. The composition of claim 13 wherein the composition further comprises maltodextrin.

20. The composition of claim 19 wherein maltodextrin is present in an amount ranging from about 1% to about 3%.

21. A method of preparing a thixotropic chocolate icing composition of claim 9, the method comprising the steps of:

a) heating a mixture of from about 8 to about 15% of granular sugar, by weight of total crystalline sugar, from about 0.04% to about 0.2% of the iota carrageenan gum, and from about 20 to about 50% of water, by weight of total water, to a temperature in the range of from about 96° to about 101° C., to obtain a first solution;

b) heating a mixture comprising from about 40 to about 50% of water, by weight of total water, the remaining sugar, and from about 0.004% to about 0.01% calcium ion to a temperature in the range of from about 95° C. to about 101° C., to obtain a second solution which is subsequently cooled to a temperature in the range of from 70° C. to 80° C.;

c) adding with stirring from about 4.5% to about 6.5% of cocoa to the second solution, to obtain a third solution;

d) admixing the first solution obtained in step (a) to the third solution obtained in step (c) at a temperature in the range of from 38° C. to 46° C., to obtain a fourth solution; and e) adding with stirring from about 65% to about 70% of fondant to the fourth solution, to obtain the icing wherein the total amount of the granular sugar in the composition is from about 8% to about 13% and the total amount of water is from about 10% to about 14%.

22. The method of claim 21 further comprising a step of adding a maltodextrin solution after the addition of fondant in step (e).

23. The method of claim 21 wherein the fondant is at least four hours old at the moment of addition in step (e).

* * * * *